United States Patent [19]

Stagner

[11] Patent Number: 6,017,078
[45] Date of Patent: Jan. 25, 2000

[54] CAR COVER BRAZIER COMBINATION

[76] Inventor: Terence Patrick Stagner, 3259 S. Dayton Ct., Denver, Colo. 80231

[21] Appl. No.: 08/998,693

[22] Filed: Dec. 29, 1997

[51] Int. Cl.[7] .................................. B60J 7/20; B60R 9/02
[52] U.S. Cl. ............................................. 296/136; 280/770
[58] Field of Search ............................ 280/770; 296/136, 296/98; 150/166; 135/88.05, 88.01, 88.08, 88.15, 88.07; 160/370.21

[56] References Cited

U.S. PATENT DOCUMENTS

| | | | |
|---|---|---|---|
| 4,938,522 | 7/1990 | Herron et al. | 296/136 |
| 4,997,229 | 3/1991 | Swanson | 296/136 |
| 5,056,817 | 10/1991 | Fuller | 280/770 |
| 5,112,098 | 5/1992 | Lichtmann | 296/136 |
| 5,176,421 | 1/1993 | Fasiska | 296/136 |
| 5,497,819 | 3/1996 | Chiang | 150/166 |
| 5,516,181 | 5/1996 | Thompson | 296/98 |

*Primary Examiner*—Lanna Mai
*Assistant Examiner*—Jeff Restifo

[57] ABSTRACT

A protective vehicle cover that is stored within a storage compartment attached to a vehicle brazier. The vehicle cover extends the length of the vehicle. The cover is secured to the vehicle over the rear of the vehicle and within the brazier storage compartment. The manual deployment of the vehicle cover is reversed when not in use.

16 Claims, 11 Drawing Sheets

CAR COVER BRAZIER COMBINATION

BACKGROUND—FIELD OF INVENTION

This invention pertains to vehicle covers and braziers, specifically integrating the use of a vehicle cover with a vehicle brazier.

BACKGROUND—DESCRIPTION OF PRIOR ART

Automobile parts stores and manufactures offer vehicle braziers and covers to consumers for the utilization of protection against daily driving weather conditions. These accessories protect the exterior finish and aesthetic appeal of the vehicle.

The vehicle brazier and cover are currently sold separately and offer only a singular benefit. The vehicle brazier is attached to the front of the vehicle and protects the paint finish of the vehicle from small pebbles and debris. The vehicle cover is typically stored within the vehicle trunk or interior cabin prior use. When the vehicle is at rest, the cover is installed over the entire vehicle. The cover helps protect the vehicles paint finish against weather elements and dust. Since the accessories are sold individually, a consumer must purchase both items if the benefits of both items are desired.

Inventors have created several cover designs, which are attached to the vehicle to facilitate use. U.S. Pat. No. 5,472,257 to Kaya (1995) discloses a storage case mounted below the front bumper and extends a vehicle cover by means of a cable system of distal lengths to the car cover. However, this invention fails to take into account potential damage incurred by wire cables, which deploy the vehicle cover. U.S. Pat. No. 5,516,181 to Thompson (1996) shows a vehicle cover container mounted in a cylinder or similar case. The cover is rolled out of the cylinder much like a bedroom curtain shade. This invention detracts the appearance of the vehicle. It fails to account for mounting difficulties for such a container. U.S. Pat. No. 5,456,515 to Dang (1995) disclose a curtain body which mounts on the roof. This invention is impractical if your particular vehicle has a sunroof. Several types of vehicle covers have been proposed recently, U.S. Pat. No. 5,401,074 to Timerman (1995), 5,161,849 to Holland, Jr. (1992), 5,112,098 to Lichtmann (1992). Although these inventions accomplish their intended function to serve as a vehicle cover, they all suffer from a number of disadvantages:

(a) The use of a vehicle brazier alone may result in uneven color fading. The portion of paint finish beneath the vehicle brazier may resist oxidation and fading more so than of the uncovered portion of the vehicle.

(b) The use of a vehicle cover alone may result in exterior paint finish damage to the front portion of the vehicle due to oncoming objects, such as pebbles, sand, and other small debris.

(c) Use of a vehicle cover is diminished since application can be time consuming and cumbersome. Typically, the owner of a vehicle cover carefully unfolds the cover and then pulls the cover over each corner of the vehicle. After use, the cover is carefully folded and then stored.

(d) The operator needs to retrieve and replace the cover. Typically, the cover is stored within the trunk of the vehicle. Time spent to retrieve and replace the cover may seem like a burden when time constraint is an issue.

(e) The consumer must make two separate purchases to fulfill the encompassing protection of the vehicle's exterior paint finish.

OBJECTS AND ADVANTAGES

Accordingly, some of the more pertinent objects and advantages of the subject invention include:

(a) Facilitate use of both a vehicle brazier and cover to mitigate the potential uneven oxidation and fading found when using a vehicle brazier alone.

(b) Offer the consumer an accessory, which protects the front portion of the vehicle finish when the vehicle is in operation.

(c) Facilitate deployment of a vehicle cover enabling the operator to quickly pull the cover over the vehicle. In addition, the operator only need to install the cover over the vehicles rear bumper, further easing use of the accessory.

(d) Location of the vehicle cover will be attached to the vehicle brazier. Rather than retrieve a cover, the operator will simply open the brazier pocket that stores the cover and pull it over the vehicle.

(e) Since the vehicle cover-brazier is a dual-purpose accessory, the consumer needs to buy only one item versus two if the protection of both applications is desired.

The reader will see that the dual-purpose function of this invention combines the protection of a vehicle brazier with that of a complete vehicle cover. The convenience of the cover's location and being attached to the brazier facilitates use of the cover. The cover is then as less cumbersome to deploy and replace back into storage compartment. Integrating the utility of what is typically two separate purchases, the vehicle cover-brazier combination offers the consumer a single purchase option. Further advantages include:

mitigating the potential uneven oxidation and fading found when using a vehicle brazier alone;

offering the consumer an accessory, which protects the front portion of the vehicle finish when the vehicle is in operation;

easing use of the vehicle cover accessory since the operation only needs to attach the cover over the vehicle's rear bumper; and allowing the operator to simply open the vehicle brazier pocket and pull the cover over the vehicle rather than unfolding and attaching a standard cover over the entire vehicle.

The proceeding description includes numerous specifics, which should not be construed as narrowing the application of the invention. For example, the vehicle brazier and cover can be tailored to the specific shape, dimensions, and utility of individual vehicle models. Also, the material and color of the vehicle brazier, pocket, zipper, and cover can vary by consumer choice. Furthermore, the location, size, and form of the vehicle brazier, pocket, zipper, and cover can vary by specifications of individual vehicle models.

Thus, the scope of the invention should be determined by the appended claims and their legal equivalents, rather than by the examples given.

DRAWING FIGURES

In the drawings, closely related figures have the same number but different alphabetical suffixes.

REFERENCE NUMERALS IN DRAWINGS

| | |
|---|---|
| 10 vehicle | 12 vehicle brazier |
| 14 vehicle brazier pocket | 16 brazier pocket zipper |
| 18 vehicle cover | 20 vehicle cover elastic band |

SUMMARY

The present invention relates to a vehicle cover secured within a pocket attached to a vehicle brazier.

DESCRIPTION—FIGS. 1 to 4

Figure 1A:
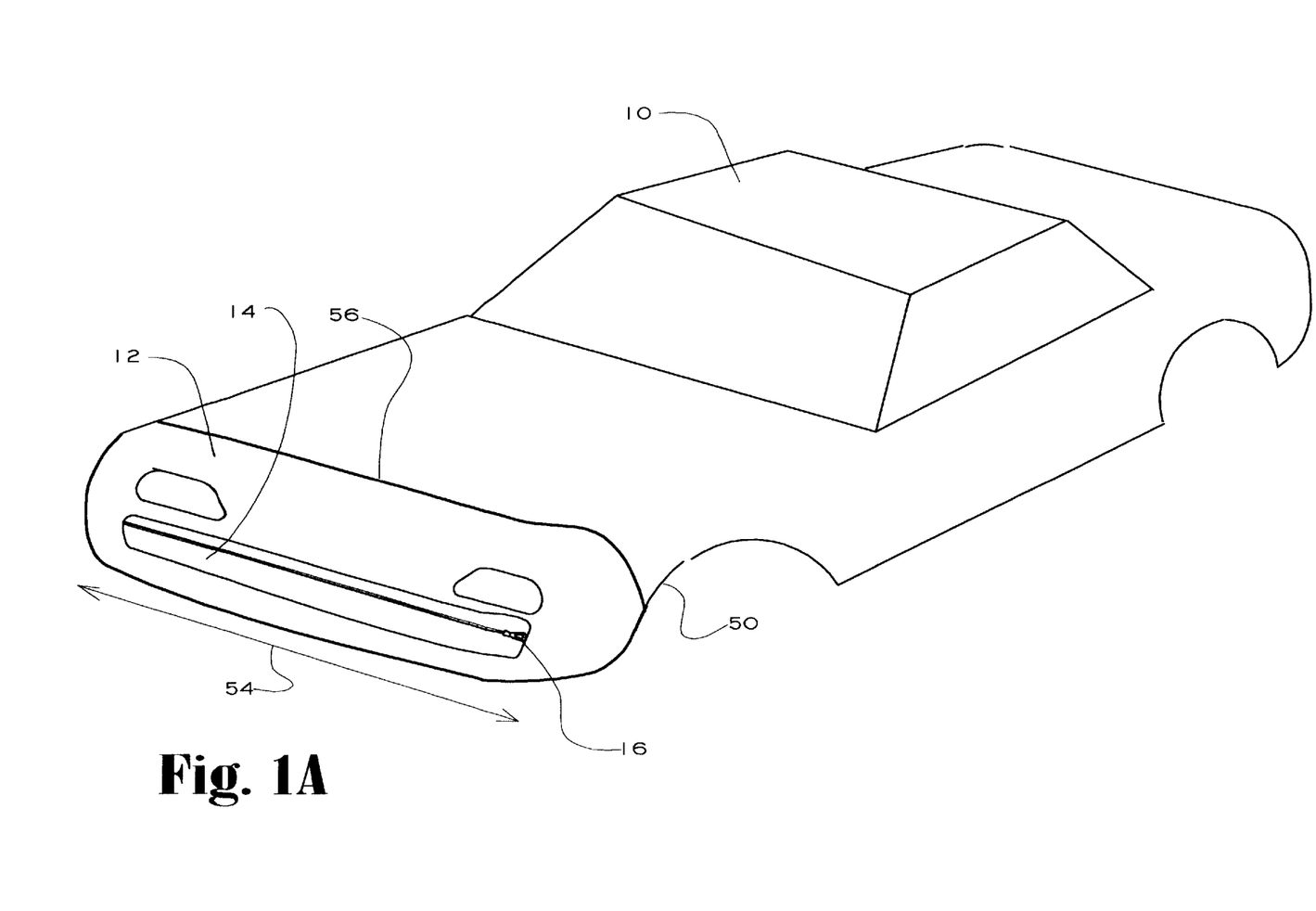
FIGS. 1A to 1B show a zipper extending the longitudinal axis of a pocket on a parallel plane running the length of the car brazier.
Figure 1B:
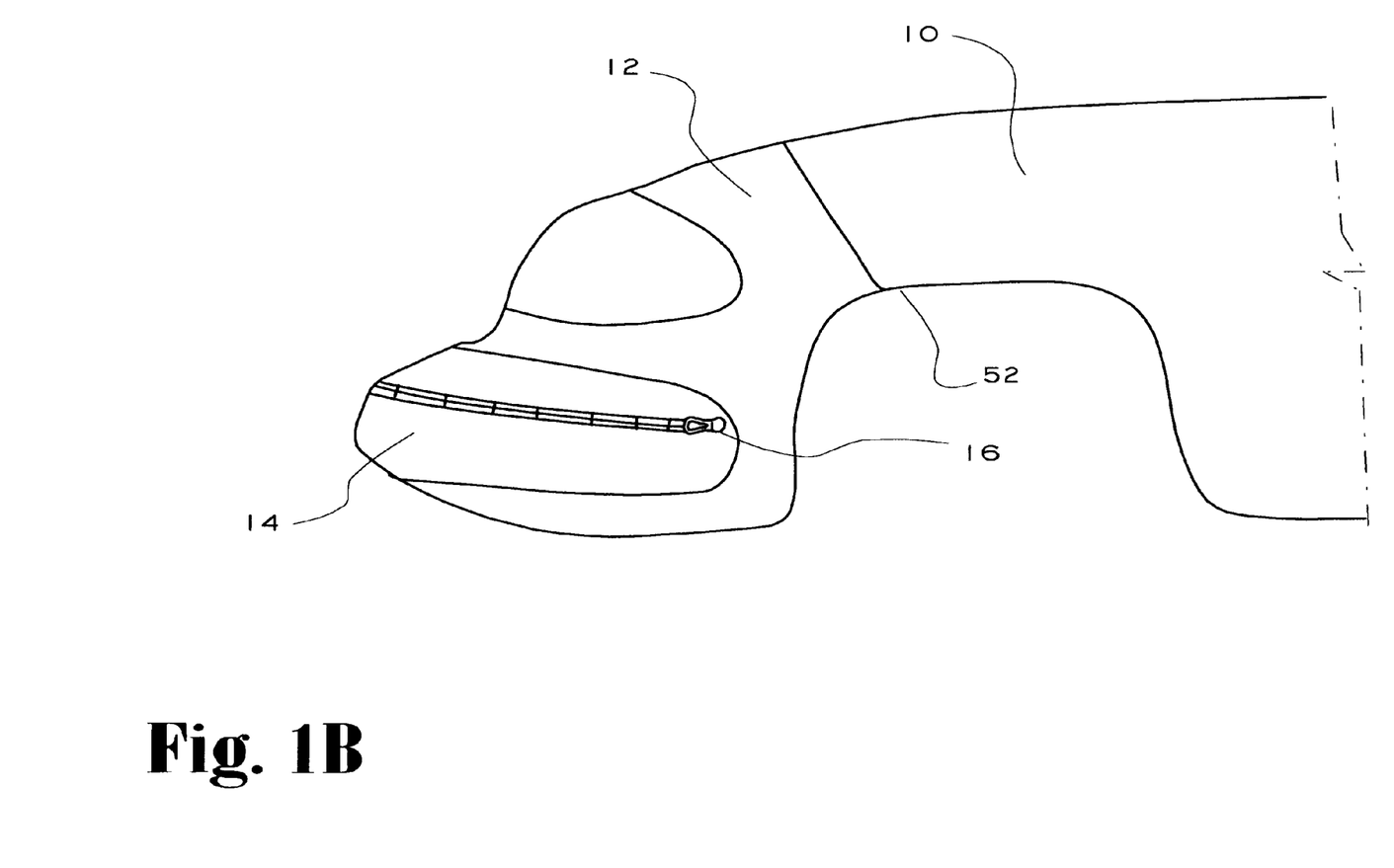
Figure 2A:
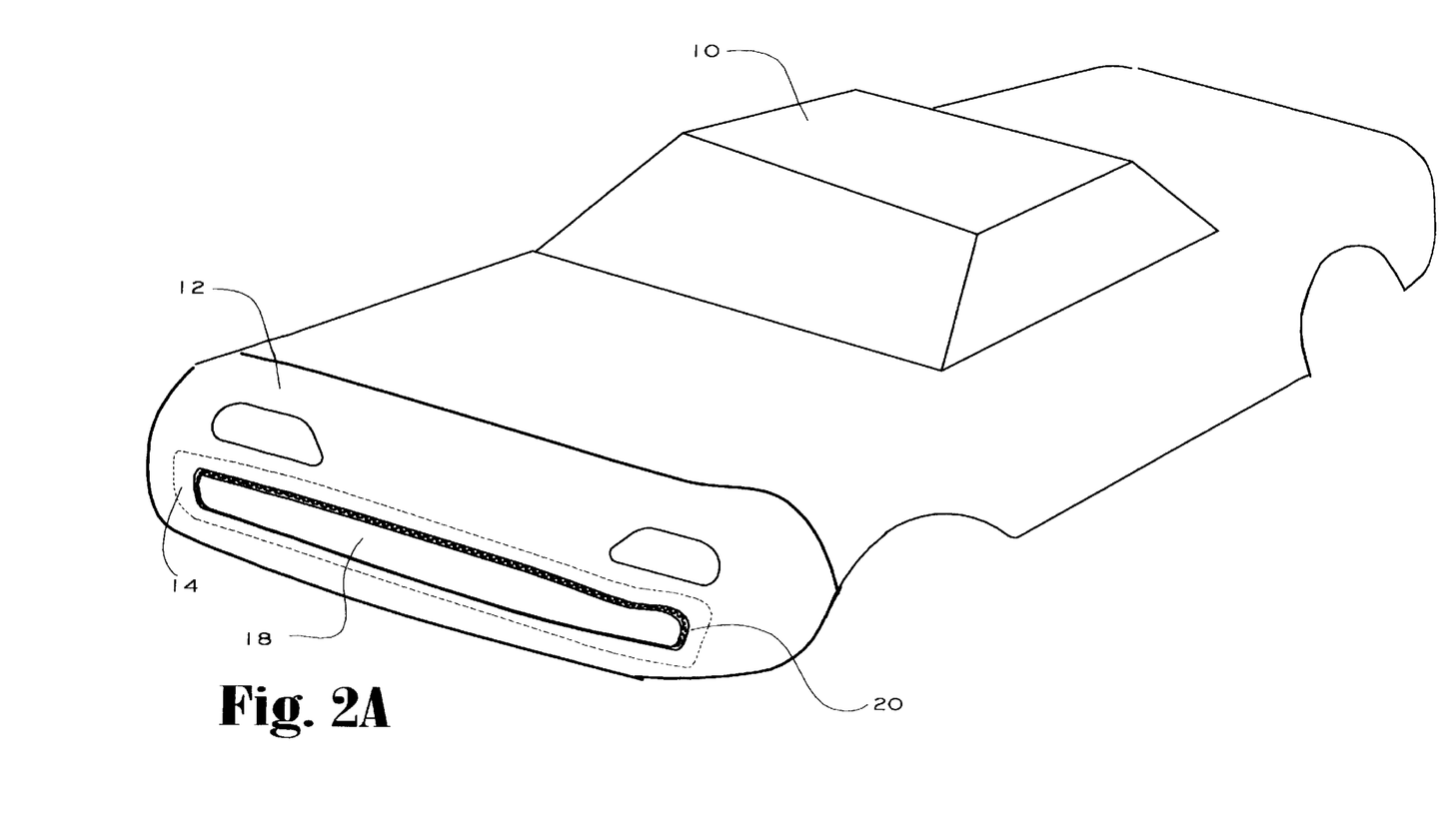
FIG. 2A to 2B show the car cover in the stowed position within the outline of the hidden brazier pocket.
Figure 2B:
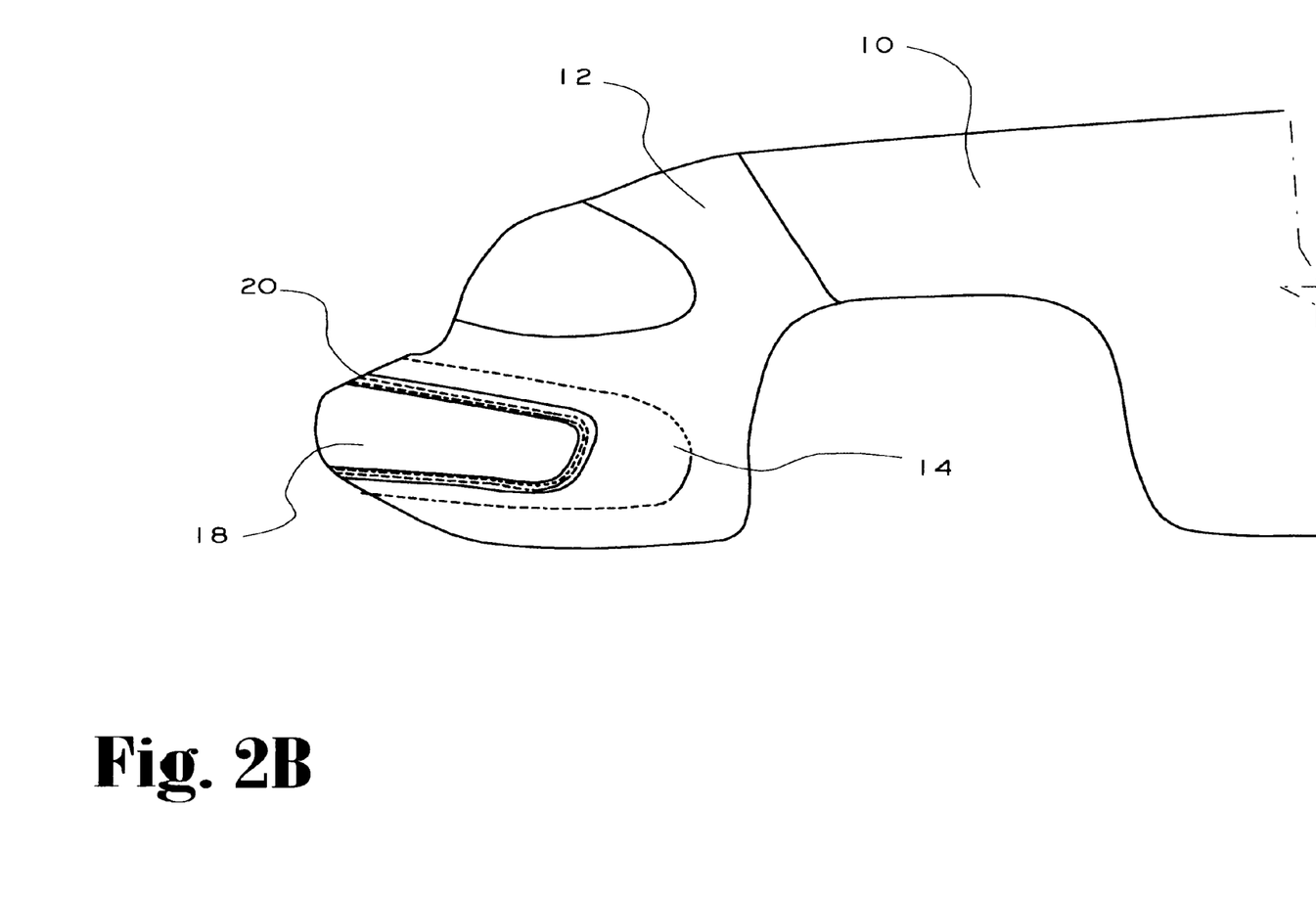

A typical embodiment of the present invention is illustrated in FIG. 1A (front view) and FIG. 1B (side view). The vehicle 10 is illustrated with a vehicle brazier 12. The vehicle brazier 12 is made of a material that is fitted and generally conforms to the shape of the front of the vehicle 10. The vehicle 10 is a length 50, and includes a front portion 52 of a width 54. In the preferred embodiment, the brazier is made of manmade nylon polyester or manmade Naugahyde leather typical of all braziers marketed today. However, the brazier can be made of any material that can be fitted and conformed to a variety of shapes, such as vinyl, rubber, leather, various impregnated or laminated fibrous materials, various plasticizes materials,etc. The vehicle brazier 12 includes an elongated body 56, which covers a a substantial portion of the width of the front portion 52 of the vehicle, is fitted with a brazier zipper 16 running parallel to the brazier 12. The brazier zipper 16 is made of metal or plastic material and is permantly attached to the car brazier 12 and the brazier pocket 14. In the preferred embodiment, the pocket is operated with a zipper; however, the operation of the pocket may be facilitated by the use of a connecting material, snaps or some similar means. The brazier zipper 16 once opened reveals the vehicle cover 18 within the brazier pocket 14. (FIGS. 4A and 4B) The vehicle cover 18 is attached to the brazier pocket 14.

Figure 3A:
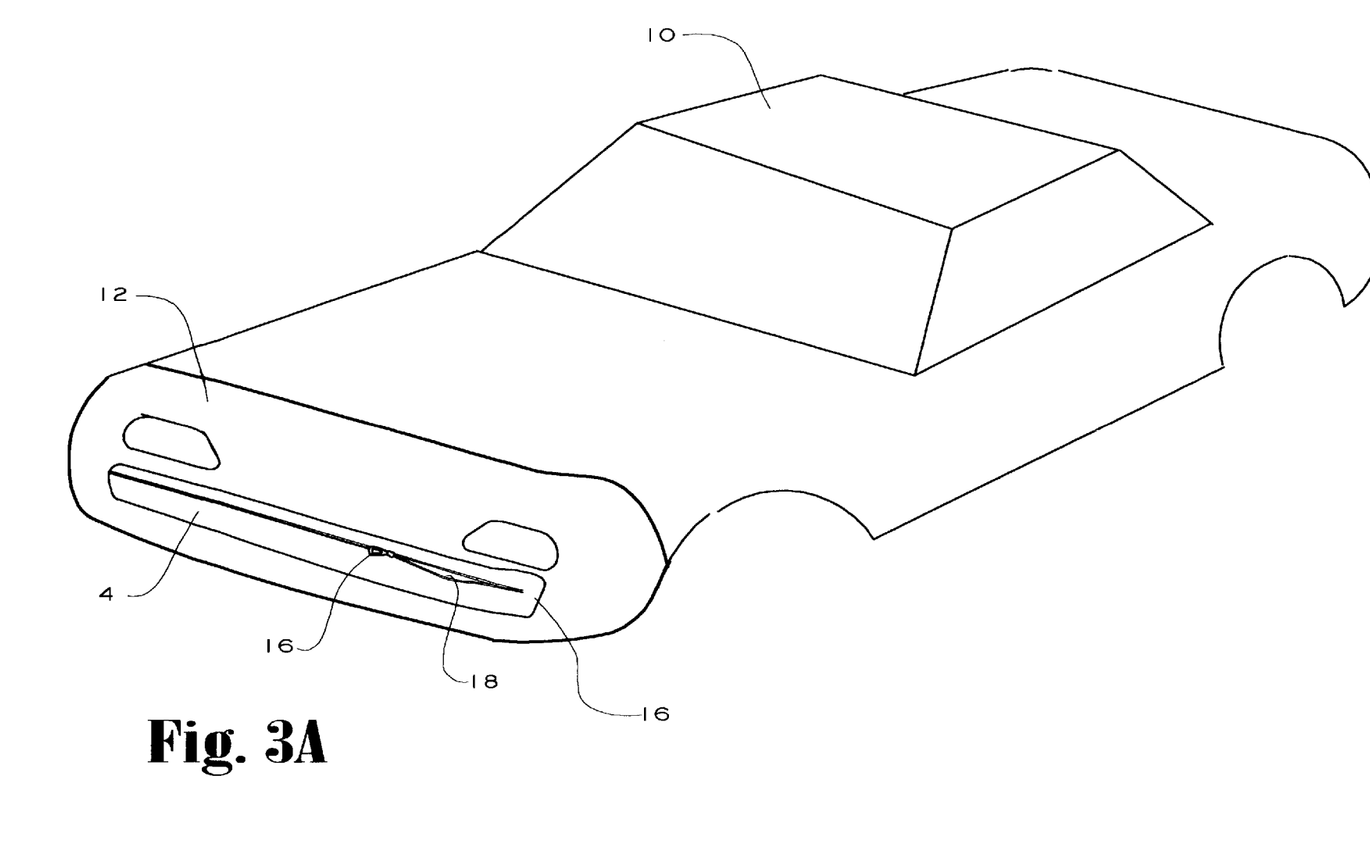
FIG. 3A to 3B show the pocket zipper partially open.
Figure 3B:
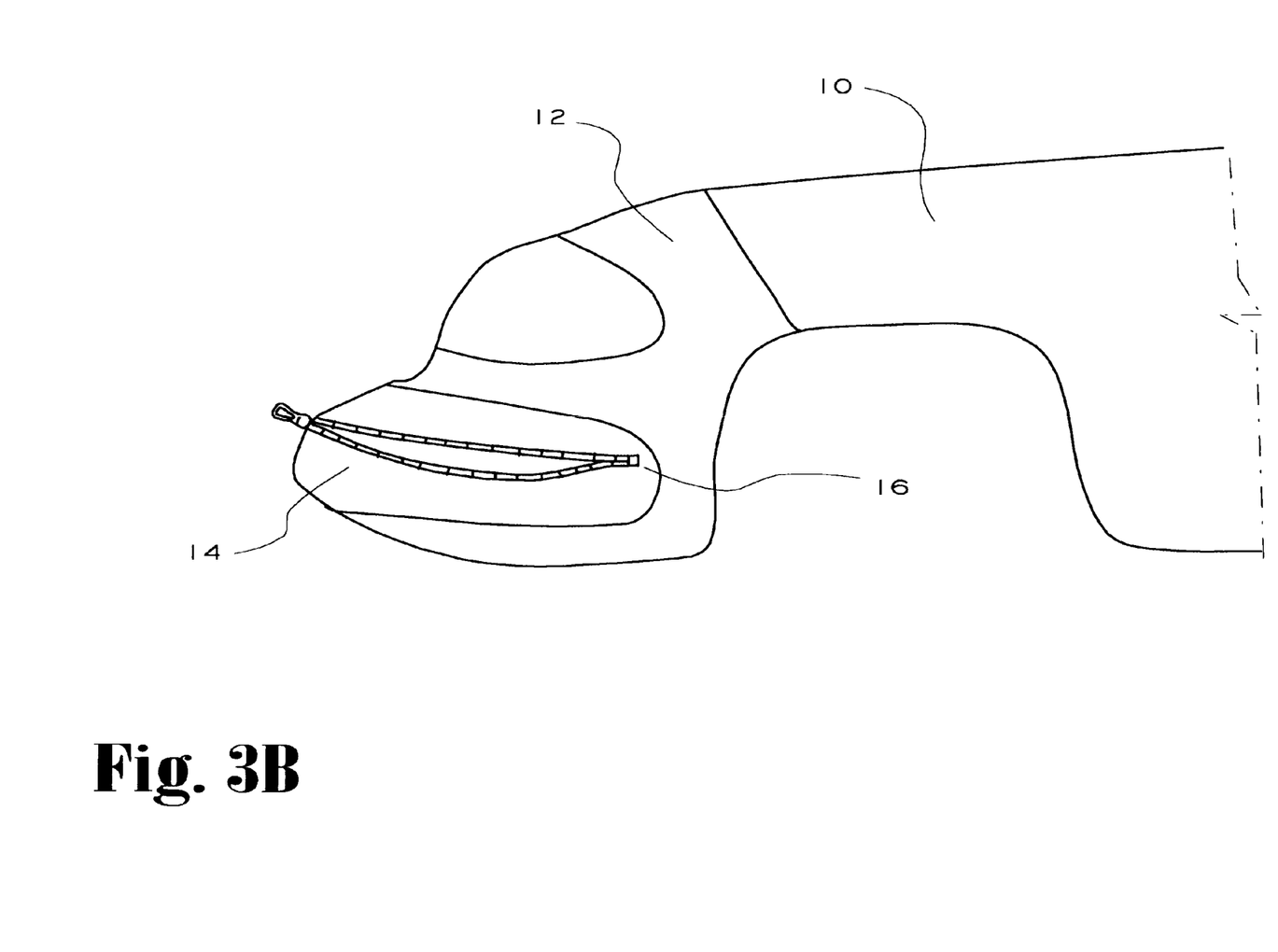
Figure 6:
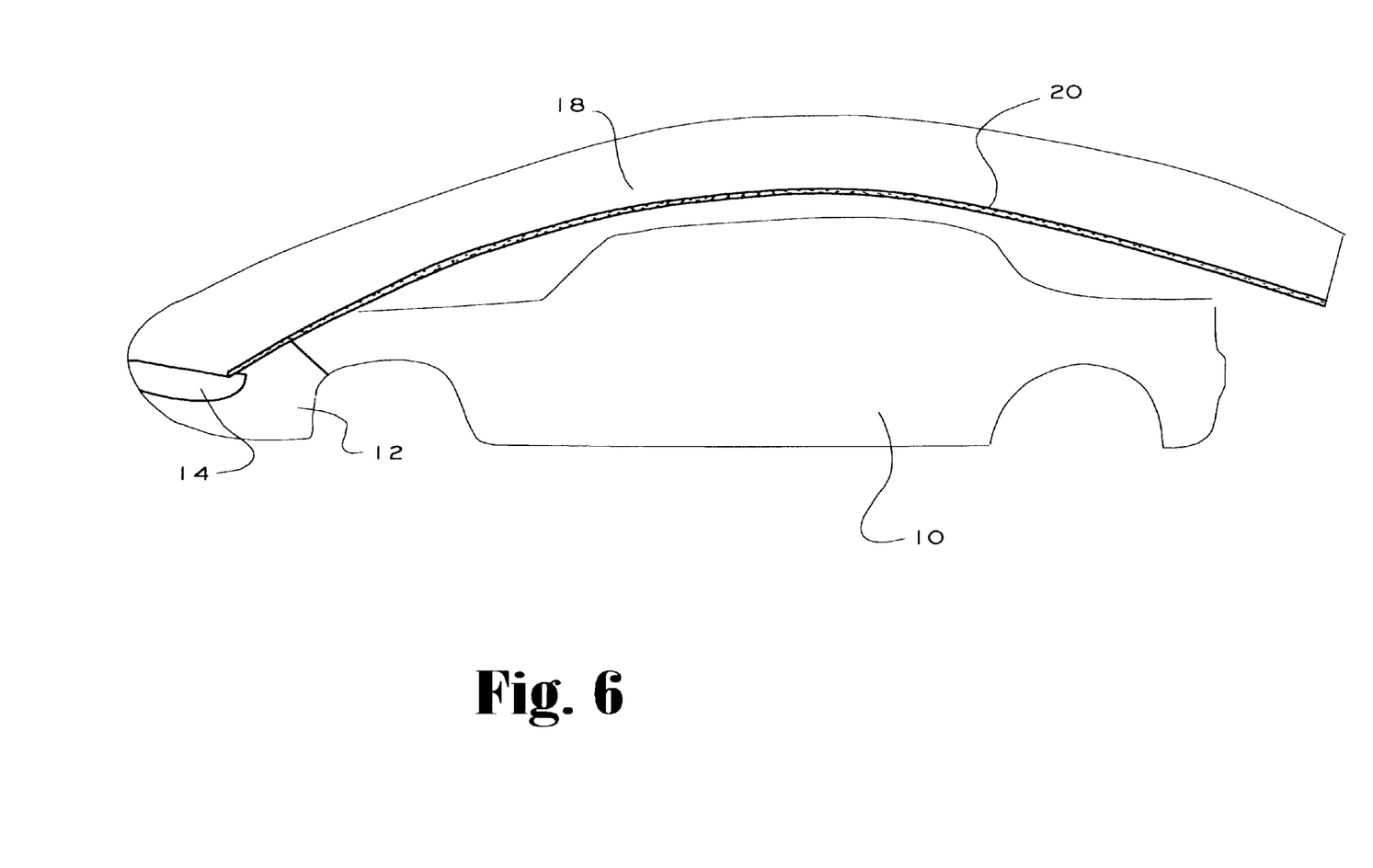
FIG. 6 shows the vehicle brazier pocket in the opened position and the vehicle cover extending out of the brazier pocket up and above the vehicle towards the rear bumper.
Figure 7:
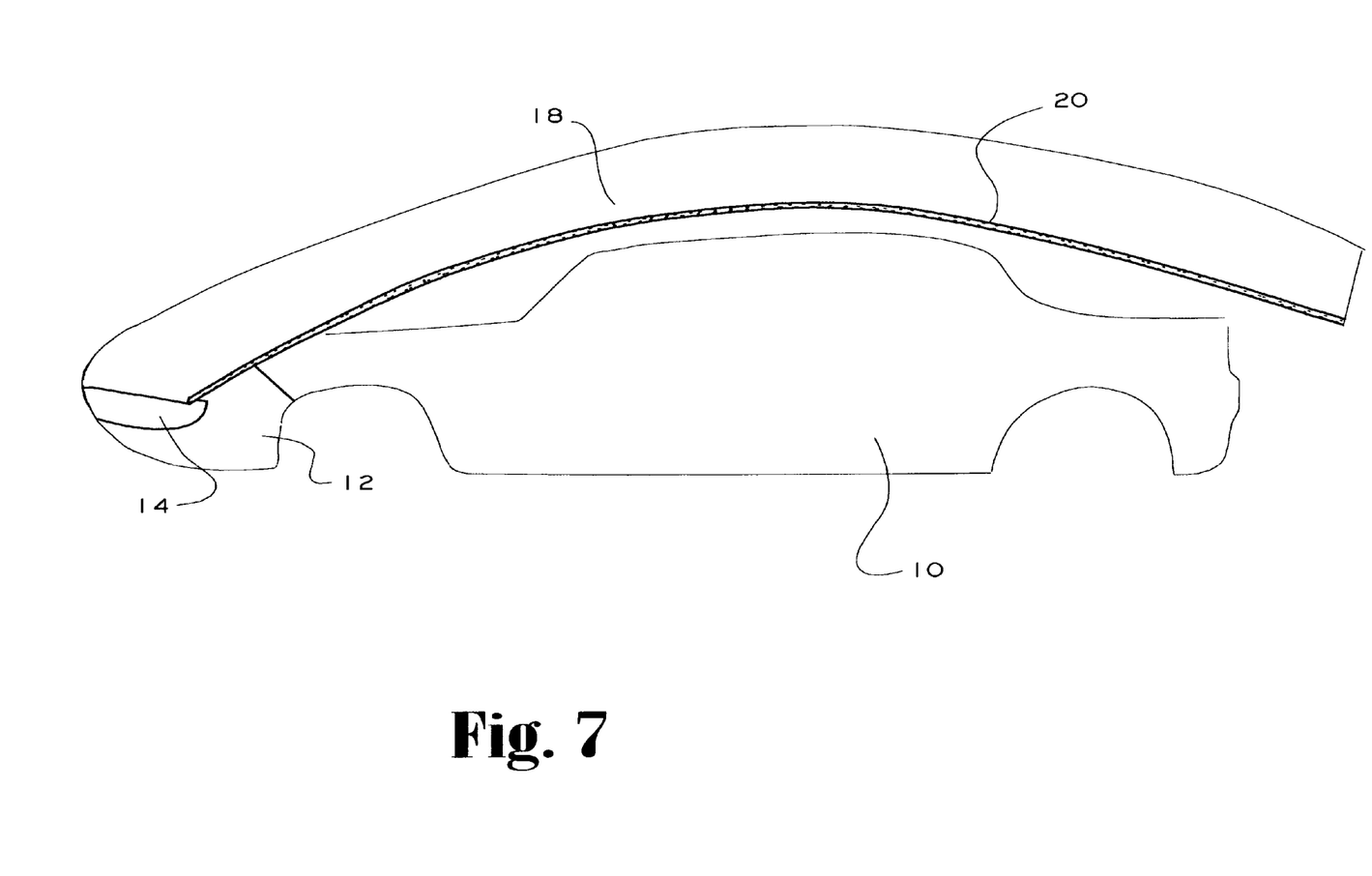
FIG. 7 shows the vehicle cover in the deployed position extending from the brazier pocket and around the rear bumper.

FIGS. 6 and 7 show the vehicle cover 18 in a deployed position. After the brazier pocket 14 is opened, the vehicle cover 18 is pulled back to the rear of the vehicle 10. An elastic band 20 runs parallel to the bottom edge of the vehicle cover 18. The preferred embodiment of the vehicle cover 18 is made of lightweight nylon polyester; however, the cover can be made of any material that can be fitted and conform to a variety of shapes, such as vinyl, rubber, leather, various impregnated fibrous materials, various plasticized materials, etc. In the preferred embodiment the elastic band 20 is made of manmade polyester nylon or any other manmade materials providing the same qualities; and runs the perimeter of the vehicle cover 18. It may also be a substituted with a cord or strap system running the perimeter of the vehicle cover 18. Additional embodiments are shown in FIGS. 3A, 3B, 4A, 4B. In each case the brazier pocket 14 has been opened and reveals the vehicle cover 18 inside. In FIGS. 3A and 3B the vehicle brazier 12 is shown with the brazier pocket 14 in the partially opened position.

Figure 4A:
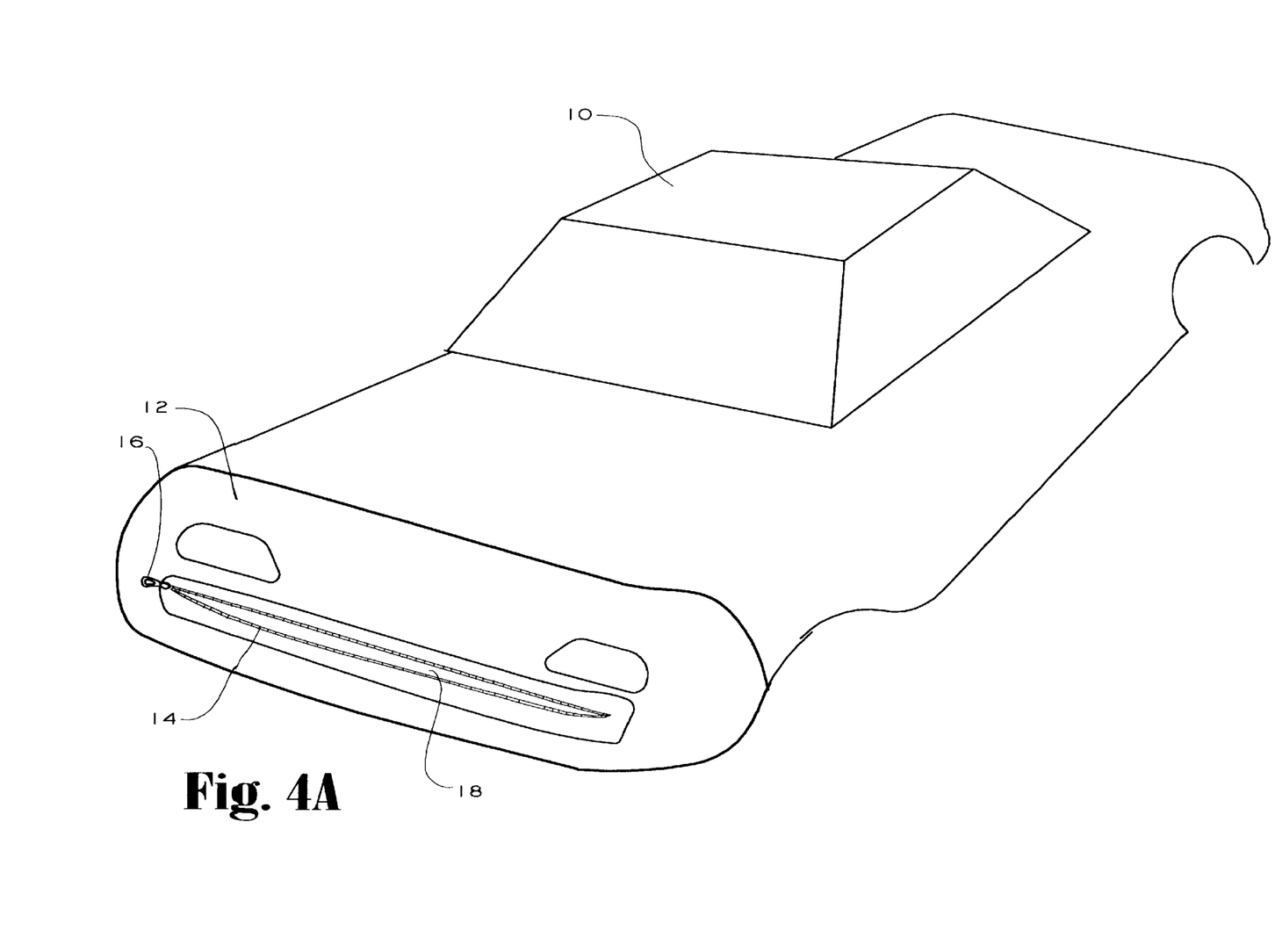
FIG. 4A to 4B show the brazier pocket completely opened revealing the car cover within.
Figure 4B:
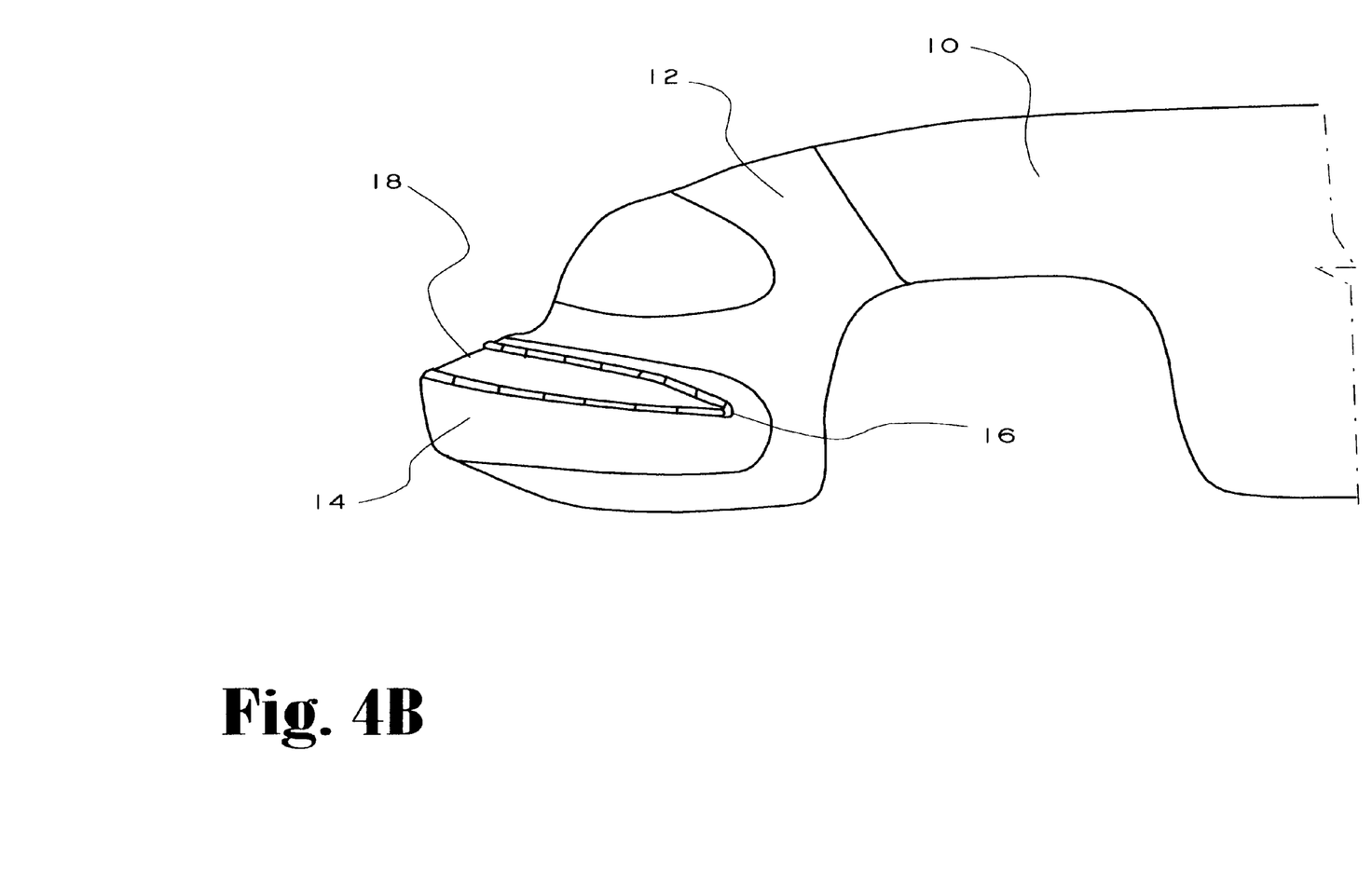
Figure 5:
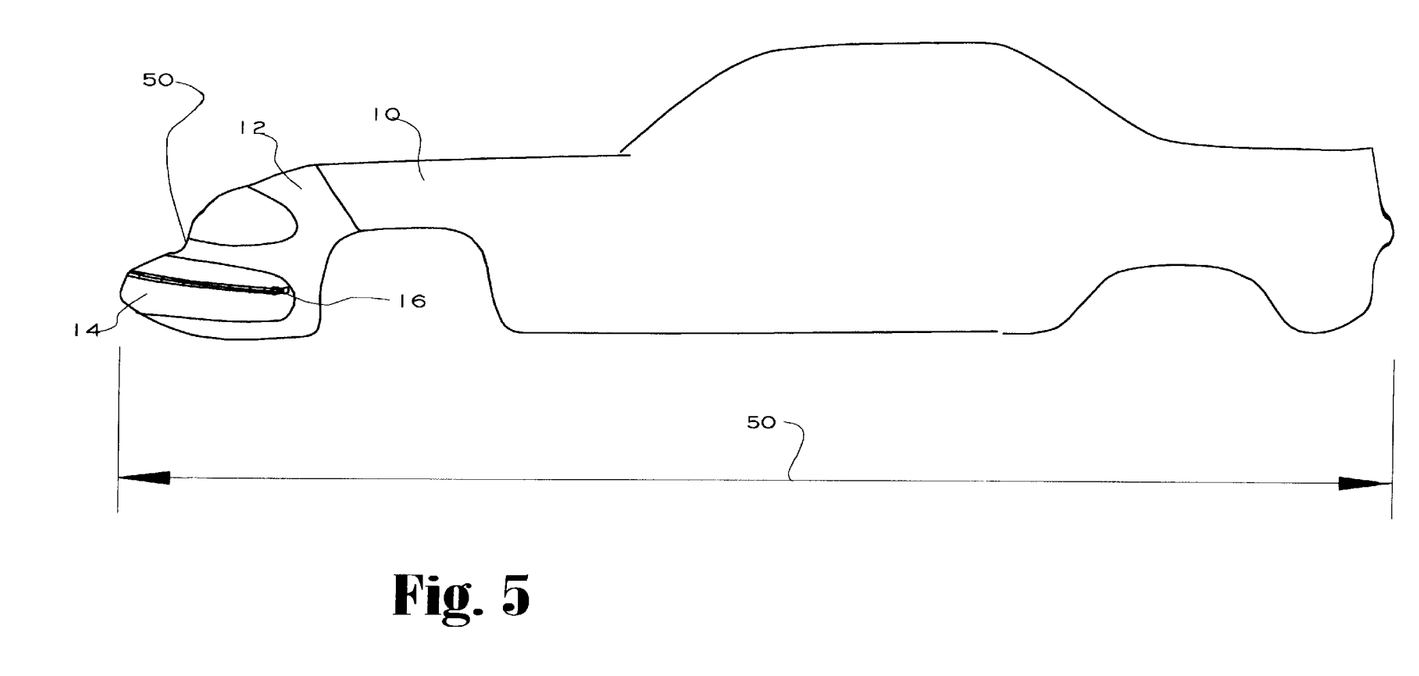
FIG. 5 shows the vehicle brazier and brazier pocket in the closed position from a side view.

In FIGS. 4A and 4B the brazier pocket 14 is in the fully opened position and revealing the vehicle cover 18. In FIG. 6 and 7 the vehicle cover is in the fully extended position from the front of the vehicle 10; the vehicle cover 18 is clinched at the base of the vehicle 10 by means of the vehicle cover elastic band 20.

From the description above, a number of advantages of my car brazier-cover combination become evident:

(a) The vehicle brazier protects the exterior paint finish of the vehicle.

(b) The vehicle cover protects the exterior paint finish of the entire body.

(c) The brazier pocket for the vehicle cover encourages the deployment of the vehicle cover.

(d) Consumers need to purchase only one product for the dual purpose of protecting their vehicle.

OPERATIONS—FIGS. 1, 2, 3, 4, 5, 6, 7

The operation of the vehicle cover-brazier is similar to present operations. With the vehicle cover-brazier in place, first one opens the brazier zipper 16 in FIGS. 1, 3 & 4 from right to left as one faces the front of the vehicle. Next, holding the vehicle cover 18 in FIGS. 4A and 4B, one unfurls the vehicle cover 18 up and out the brazier pocket 14 towards the rear of the vehicle 10. As seen in FIG. 6 the cover 18 is pulled over the rear bumper of the vehicle with the elastic band 20 securing the vehicle cover 18 to the vehicle 10. Since the vehicle cover 18 is attached to the brazier 12, the vehicle cover 18 is securely attached at the front of the vehicle. FIG. 7 shows the vehicle cover 18 in the fully extended position, draped over the entire vehicle 10 from the anchor point of the vehicle brazier 12 to the rear of the vehicle 10. The vehicle cover 18 is in a cinched position due to the vehicle cover's elastic band 20 being mounted along the bottom of the vehicle cover 18.

The operation off repacking the vehicle cover 18 into the brazier 12 is exactly the reversal of the operation noted above. As seen in FIG. 7, when the vehicle cover 18 is in the fully extended position and cinched by the vehicle cover elastic band 20, one simply stretches the vehicle cover elastic band 20 up and over the rear bumper of the vehicle 10. Then one manually pulls the vehicle cover 18 towards the front off the vehicle 10. The vehicle cover 18 is then repacked into the brazier pocket 14. The brazier zipper 16 is then closed from left to right as one faces the front of the vehicle 10.

I claim:

1. A protective brazier and car cover for use on a vehicle having a length and a front portion having a shape, a bumper, and a width, the bumper extending across the width of the front of the vehicle, the brazier and car cover comprising:

a protective brazier portion having a flexible elongated body adapted for extending over and across the front portion of the vehicle to cover at least a substantial portion of the width of the front of the vehicle and a portion of the length of the front of the vehicle while conforming to the shape of the front of the vehicle, the elongated body further having a pocket; and a flexible vehicle cover attached to said elongated body and adapted for extending over the length of the vehicle, the vehicle cover being stowable in said pocket when not in use, so that the elongated body and car cover conform to the shape of the front of the vehicle while concealing the car cover when the car cover is not in use.

2. A protective brazier and car cover according to claim 1 and further comprising means for allowing headlights to illuminate past the elongated body of the brazier portion.

3. A protective brazier and car cover according to claim 1 wherein said pocket includes an interior portion and said cover is attached to the interior portion of the elongated body.

4. A protective brazier and car cover according to claim 1 wherein said pocket further comprises means for retaining the pocket in a closed position when the car cover is stowed within the pocket.

5. A protective brazier and car cover according to claim 1 wherein the elongated body is of a length and said pocket extends substantially the entire length of the elongated body.

6. A protective brazier and car cover for use on a vehicle having a front portion having a bumper, the front portion of the vehicle also having a length, and a width, the brazier and car cover comprising:

a flexible, protective brazier portion having an elongated body adapted for extending across the front portion of the vehicle to cover at least a substantial portion of the width of the front of the vehicle and a portion of the length of the front of the vehicle, the body further having a pocket and means for supporting the protective brazier against the front of the vehicle; and a vehicle cover of a flexible material attached to said pocket and adapted for extending over and covering the vehicle, the vehicle cover being stowable in said pocket when not in use, so that the flexible body cooperates with the flexible cover to conform to the contour of the front of the vehicle and conceal and transport the car cover when the car cover is not in use.

7. A protective brazier and car cover according to claim 6 and further comprising means for allowing automobile headlights to illuminate past the elongated body of the brazier portion.

8. A protective brazier and car cover according to claim 7 wherein said pocket includes an interior portion and said cover is attached to the interior portion of the elongated body.

9. A protective brazier and car cover according to claim 8 wherein said pocket further comprises means for retaining the pocket in a closed position when the car cover is stowed within the pocket.

10. A protective brazier and car cover according to claim 6 wherein the elongated body is of a length and the opening of said pocket extends substantially the entire length of the elongated body.

11. A protective brazier and car cover for use on a vehicle having a front portion having a bumper, the front portion of the vehicle having a length, and a width, the brazier and car cover comprising:

a protective brazier portion of flexible construction, the brazier portion having an elongated body adapted for extending across the front portion of the vehicle to cover at least a substantial portion of the width of the front of the vehicle and a portion of the length of the front of the vehicle, the body further having a flexible pocket having an interior and means for retaining the pocket in a closed position; and a vehicle cover attached to the interior of said flexible pocket and adapted for extending from the interior of said flexible pocket over the vehicle, the vehicle cover being stowable in said flexible pocket when not in use, so that when the flexible pocket is closed, the flexible pocket and the elongated body conceal and hold the car cover when the car cover is not in use.

12. A protective brazier and car cover according to claim 11 and further comprising means for allowing headlights to illuminate past the elongated body of the brazier portion.

13. A protective brazier and car cover according to claim 11 wherein said pocket includes an interior portion and said cover is attached to the interior portion of the elongated body.

14. A protective brazier and car cover according to claim 11 wherein said pocket further comprises means for retaining the pocket in a closed position when the car cover is stowed within the pocket.

15. A protective brazier and car cover according to claim 11 wherein the elongated body is of a length and said pocket extends substantially the entire length of the elongated body.

16. A protective brazier and car cover according to claim 11 wherein the combined brazier and car cover remain flexible together when the car cover is stowed in the pocket.

* * * * *